United States Patent [19]
Russell

[11] 3,836,235
[45] Sept. 17, 1974

[54] WIDE REAR VIEW DAY AND NIGHT OUTSIDE MIRROR

[75] Inventor: Carl D. Russell, Tulsa, Okla.

[73] Assignees: Robert I. Studebaker; Martha Jean Studebaker, ; part interest to each

[22] Filed: Sept. 20, 1973

[21] Appl. No.: 399,450

[52] U.S. Cl.................................. 350/280, 350/307
[51] Int. Cl................................................. B60r 1/06
[58] Field of Search ........... 350/280, 283, 279, 281, 350/282, 289, 302-304, 307

[56] References Cited
UNITED STATES PATENTS
1,919,475  7/1933  McKinley............................ 350/280
3,574,446  4/1971  Moore ................................. 350/283

*Primary Examiner*—John K. Corbin
*Attorney, Agent, or Firm*—Wilfred G. Caldwell

[57] ABSTRACT

A case supports a glass in spaced apart position from a mirrored surface allowing first or second images to be reflected and held by the positioning of the mirrored surface in relation to the glass. The first image is a bright unrestricted image for day viewing; the second: an image that is soft and restricted, ideal for night viewing of bright lights at close range. The fact that the glass and mirrored surface are spaced apart allows for a wide viewing. Actuator or actuators may be extended to either or both the glass or the mirror to allow angling by remote control. The case is preferably closed and centrally supported by a vehicle support to withstand the high air currents and vibration encountered at high speeds.

3 Claims, 4 Drawing Figures

PATENTED SEP 17 1974　　3,836,235

WIDE REAR VIEW DAY AND NIGHT OUTSIDE MIRROR

PRIOR ART

The only known prior art is a wedge-shaped glass having one surface silvered and coated which is used inside of a vehicle. As the glass of mirror quality is limited in thickness and the angle of the wedge is such that only a narrow viewing area can be obtained and the optics of the wedge glass when outside in positions suitable for viewing at night causes stray lights along the side out of viewing area to reflect flashing of colors that are very objectional and irritating, making the wedge mirrored solid glass unsuitable for outside use on moving vehicles.

DESCRIPTION

The invention comprises a wide view day-night outside mirror for a vehicle, preferably a truck or heavier vehicle wherein heavy supporting means extend outwardly from the truck to support a tall mirror case against extreme forces. The supporting means penetrate the case vertically, and preferably centrally, to comprise a pivot axis therein, the combination supporting means and pivot axis being generally a U-shaped frame with the mouth of the U being attached to the vehicle. A mirror frame which may include a horizontal web is supported by the pivot axis centrally of the mirror frame with the mirror being supported vertically forwardly of the web. A glass is supported by the case in spaced substantially parallel relation to the mirror to close the case, the spacing between the mirror and glass enabling the wide viewing feature. Manually operable means extend from the mirror frame to the vehicle via the case for pivoting the mirror relative to the glass to move the end of the mirror closest to the cab toward the glass to change the direction of light reflected from the mirror out of the case to cast the mirror reflection light away from the vehicle. Movement of the mirror back to the parallel relation brings the brighter image back toward the vehicle. The case also supports conventional means for clamping the mirror frame in any position such as with the mirror substantially parallel to the glass in one viewing position and with the closest end of the mirror moved toward the glass in the other viewing position.

Figure 1:
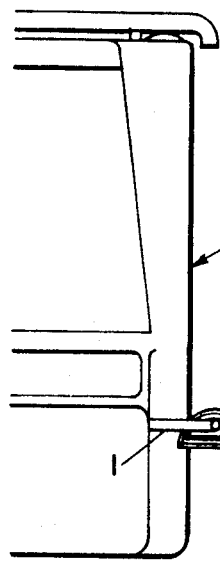
FIG. 1 is a top view of a vehicle and mirror case.
Figure 2:
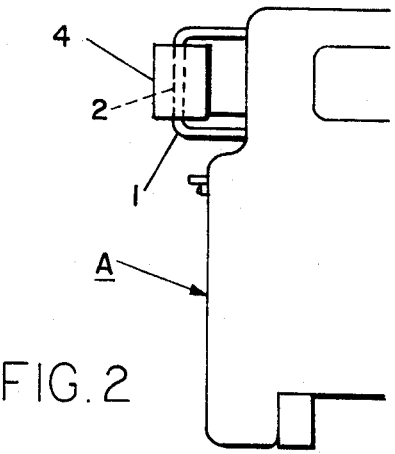
FIG. 2 is a back view of the vehicle and mirror case.
Figure 3:
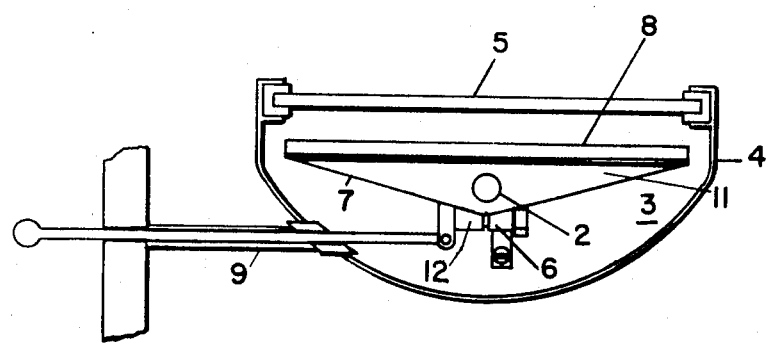
FIG. 3 is a interior view showing a suitable position for day viewing.
Figure 4:
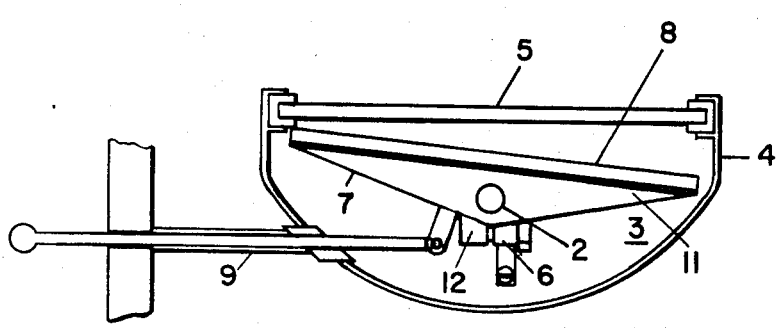
FIG. 4 is a interior view showing an angled position suitable for night viewing.

The vehicle supporting frame 1 extends outwardly from the side of vehicle A for securing the ends of pivot axis shaft 2 which penetrates case 4 substantially centrally thereof, extending above and below the case. Shaft 2 forms a pivot for alignment of the case 4 relative to the vehicle A for proper vision through glass 5 which closes the case in spaced apart relation to mirror 8 carried by mirror frame 7. Frame 7 includes a horizontal web 11 pivotally carried on shaft 2 with the shaft penetrating the web 11 centrally thereof and behind the mirror 8. Mirror frame 7 securely receives shaft 2 in order that it is rigidly supported but can be pivoted by sheathed cable 9 extending through case 3 and into vehicle A allowing the mirror 8 to be angled by remote control to suitable viewing positions.

The mirror is clamped in any conventional means as by clamp 6 supported from case 3 and carrying conventional means 12 for biasing engagement with the web 11.

OPERATION

The case holding the glass is secured to a frame extending from the vehicle, a sheath cable or other suitable activating arrangement extends from inside the vehicle and secured to the pivotal frame of the mirrored surface which will enable the operator to angle the mirrored surface in relation to the glass to select either the bright or dim image.

I claim:

1. A wide view day-night outside mirror for a vehicle comprising in combination, a mirror case; supporting means extending outwardly from the vehicle and penetrating the case vertically to comprise a pivot axis means therein; a mirror frame supported by the pivot axis means centrally of the frame; a mirror supported by the mirror frame; a glass supported by the case in spaced substantially parallel relation to the mirror to close the case; manually operable means extending from the mirror frame to the vehicle via the case for pivoting the mirror relative to the glass to move the end of the mirror closest to the vehicle toward the glass thereby changing the direction of light reflection from the mirror out of the case to cast the mirror reflected light away from the vehicle; and means for clamping the mirror frame in one position with the mirror substantially parallel to the glass and in another position with said end of the mirror moved toward the glass.

2. The mirror of claim 1 wherein the support means penetrates the case substantially centrally thereof so that the pivot axis means passes through the mirror frame to the rear of the mirror relative to the glass and substantially midway therealong.

3. The mirror of claim 2 wherein the support means including the pivot axis means comprises a substantially U-shaped extension from the vehicle for centrally supporting the case to control vibration.

* * * * *